(12) United States Patent
Hirayu

(10) Patent No.: US 7,213,671 B2
(45) Date of Patent: May 8, 2007

(54) STRUCTURE FOR MOUNTING ENGINE

(75) Inventor: Toru Hirayu, Zama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 216 days.

(21) Appl. No.: 10/690,646

(22) Filed: Oct. 23, 2003

(65) Prior Publication Data
US 2004/0154855 A1 Aug. 12, 2004

(30) Foreign Application Priority Data
Nov. 29, 2002 (JP) ............ P 2002-347223

(51) Int. Cl.
B60K 5/12 (2006.01)

(52) U.S. Cl. .......... 180/291; 180/299; 280/784; 123/195 A

(58) Field of Classification Search ........ 180/291, 180/298, 299, 232, 297, 292, 294; 280/781, 280/784; 123/195 R, 195 A
See application file for complete search history.

(56) References Cited

U.S. PATENT DOCUMENTS 4,392,545 A * 7/1983 Harasaki et al. ............ 180/294
4,487,287 A 12/1984 Watanabe
6,386,309 B1 * 5/2002 Park ............................. 180/300

FOREIGN PATENT DOCUMENTS

| JP | 55136660 A | * | 10/1980 |
| JP | 58-134133 | | 9/1983 |
| JP | 02-063924 | | 3/1990 |
| JP | 05-240283 | | 9/1993 |
| JP | 10-309945 | | 12/1998 |
| JP | 11-263130 | | 9/1999 |
| JP | 2000-168624 | | 6/2000 |
| JP | 2000-289468 | | 10/2000 |
| JP | 2001-097050 | | 4/2001 |
| JP | 2002-002310 | | 1/2002 |

* cited by examiner

Primary Examiner—Christopher P. Ellis
Assistant Examiner—John Walters
(74) Attorney, Agent, or Firm—McDermott Will & Emery LLP

(57) ABSTRACT

A structure for mounting an engine for a vehicle which includes: a supporting member for supporting the engine on a front side thereof, leaving a space between the engine and the supporting member; and an auxiliary equipment disposed in the space, wherein the supporting member has a strength against a load applied thereto in a longitudinal direction of the vehicle less than that of the auxiliary equipment.

14 Claims, 6 Drawing Sheets

STRUCTURE FOR MOUNTING ENGINE

BACKGROUND OF THE INVENTION

1. Field of the Invention

This invention relates to a structure for mounting an engine on a vehicle.

2. Description of Related Art

An engine of a vehicle such as an automobile is installed inside an engine compartment and fixed to a vehicle body. FIG. 7 shows a common structure for mounting an engine 1 (such a structure for mounting an engine will be hereinafter referred to as an "engine mounting structure" or more briefly as a "mounting structure" in this specification). The engine 1 is fixed, at a front side thereof, to a suspension member 4 through an engine bracket 2 and an engine mount 3. The engine mount 3 includes an insulator 5 which supports a front portion of the engine bracket 2, a collar 6 which holds the insulator 5, and an engine mount bracket 7 which supports the collar 6 and is formed to have a rectangular closed cross section in a plan view (see FIG. 8). A transmission 11 is provided on the rear side of the engine 1. An oil pan 12 is fitted to the bottom of the engine 1. Auxiliary equipment 16 including a starter motor 14 and a starter motor magnet switch 15 is provided on the rear upper side of the engine 1.

SUMMARY OF THE INVENTION

In the engine mounting structure described above, a large space 18 needs to be provided between the engine 1 and the engine mount 3 to secure a margin for deformation (hereinafter referred to as a "deformation margin") 17 for the engine bracket 2 (see FIG. 9), in order to prevent the engine 1 from damage when an impact load is applied from the front side of the vehicle, thereby limiting flexibility of arrangement of equipment such as the auxiliary equipment 16 inside the engine compartment.

The present invention was made in the light of this problem. An object of the present invention is to provide a structure for mounting an engine which enhances flexibility of arrangement of equipment inside an engine compartment.

An aspect of the present invention is a structure for mounting an engine for a vehicle comprising: a supporting member for supporting the engine on a front side of the engine with a space provided between the engine and the supporting member; and an auxiliary equipment disposed in the space between the engine and the supporting member, wherein the supporting member has a strength against a load applied thereto in a longitudinal direction of the vehicle less than that of the auxiliary equipment.

BRIEF DESCRIPTION OF THE DRAWINGS

The invention will now be described with reference to the accompanying drawings wherein.

DETAILED DESCRIPTION OF THE PREFERRED EMBODIMENT

Figure 1:
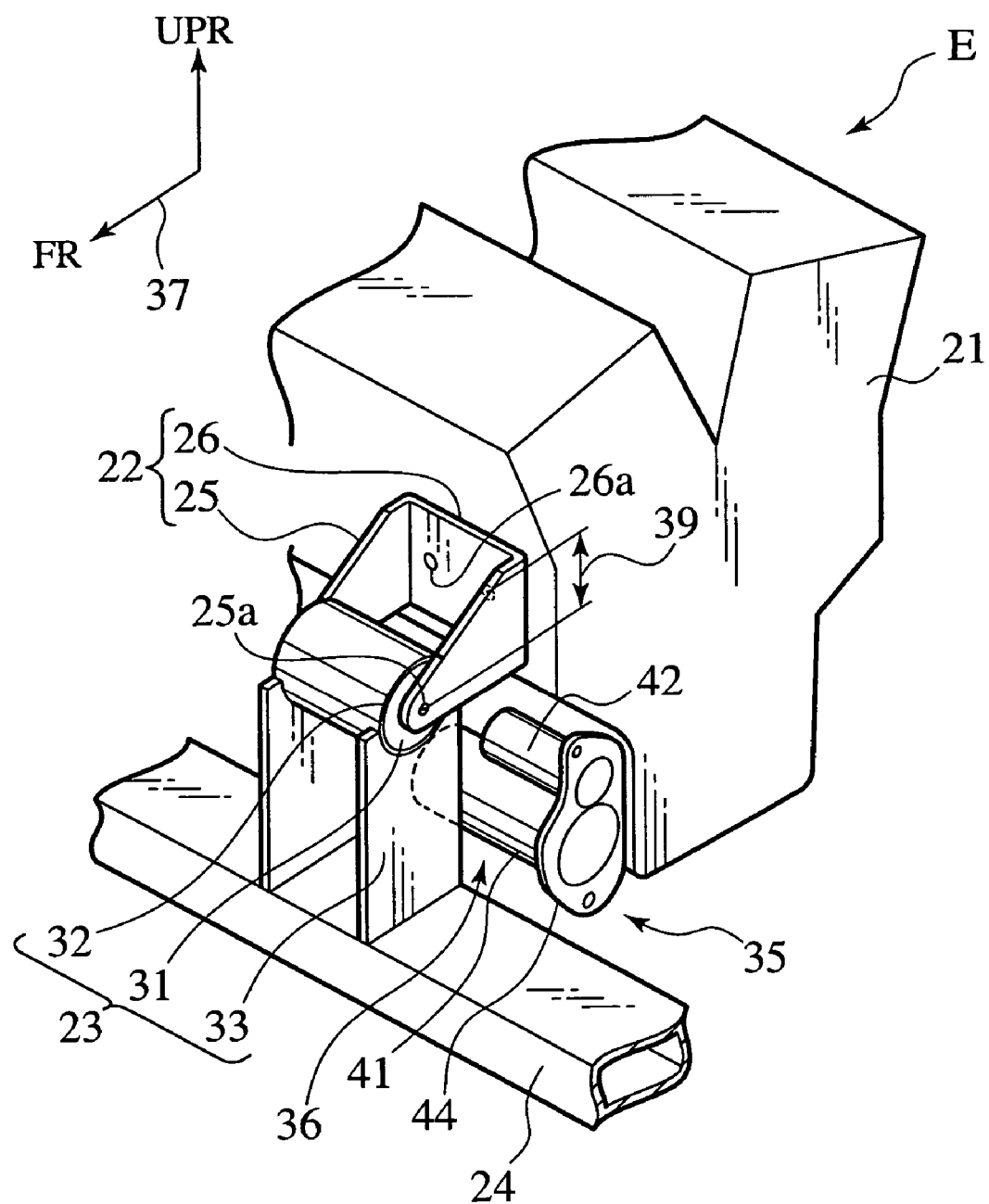
FIG. 1 is a perspective view of a structure for mounting an engine according to an embodiment of the present invention.

An embodiment of the present invention will be explained below with reference to the drawings, wherein like members are designated by like reference characters.

Figure 2:
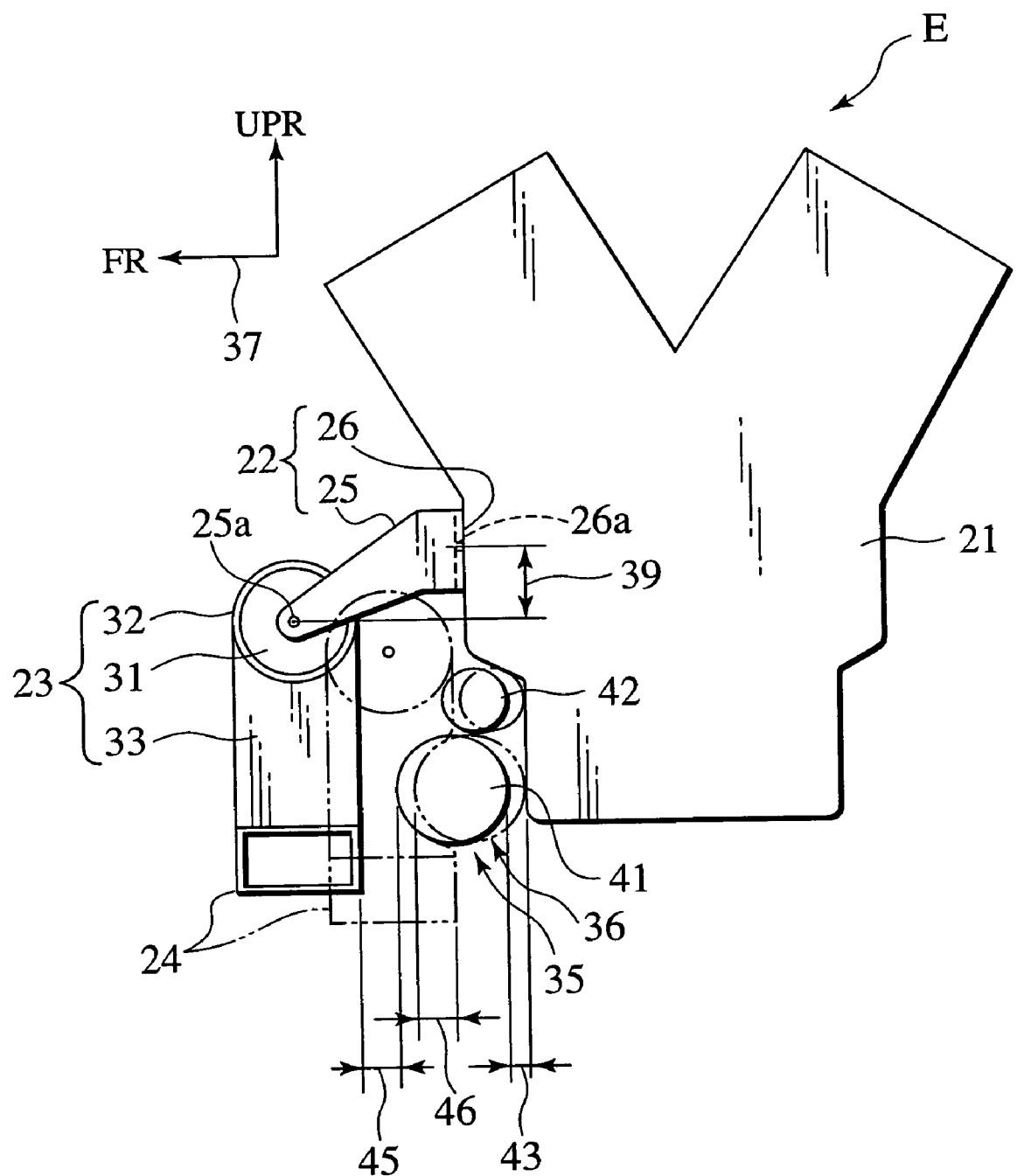
FIG. 2 is a side view of the mounting structure of FIG. 1.

An engine 21 of a vehicle such as an automobile is installed inside an engine compartment and fixed to a vehicle body. As shown in FIGS. 1 and 2, the engine 21 is fixed at the front part thereof to a suspension member 24 through an engine bracket 22 and an engine mount 23.

The engine bracket 22 comprises a pair of arms 25 which extend frontward in parallel from a front side of the engine 21, and a base 26 connecting the rear ends of the arms 25. Each arm 25 has on its front end an engine mount fixing point 25a to be fitted to an insulator 31 of the engine mount 23. Meanwhile, the base 26 has an engine fixing point 26a to be fixed to the front side of the engine 21. The pair of arms 25 and the base 26 are collectively formed substantially in a channel shape in a plan view.

Figure 3:
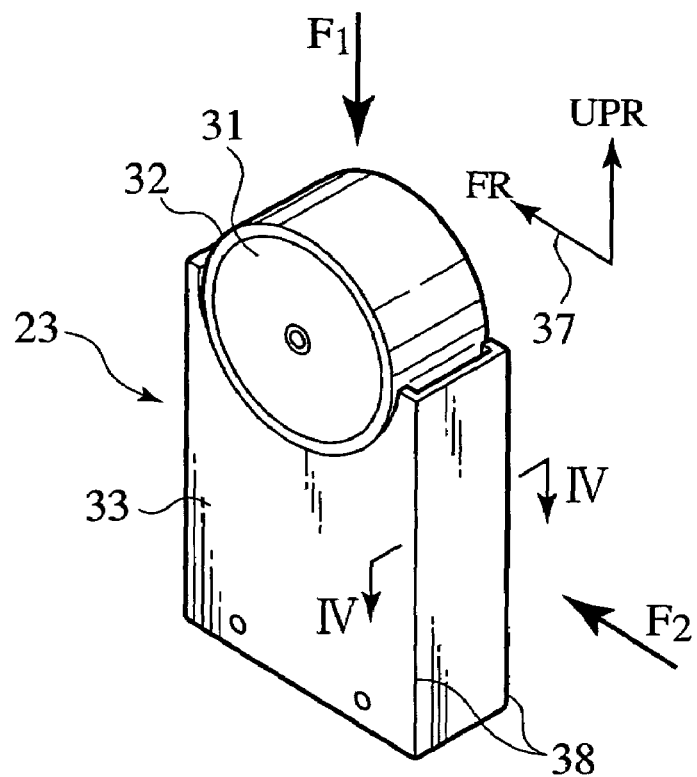
FIG. 3 is a perspective view of an engine mount 23 in FIG. 1.

As shown in FIG. 3, the engine mount 23 includes the insulator 31 which supports the front ends of the arms 25 of the engine bracket 22, a tubular collar 32 which holds this insulator 31, and an engine mount bracket 33 which supports the collar 32 from below. The bottom of the engine mount bracket 33 is fixed to the suspension member 24.

Figure 4:
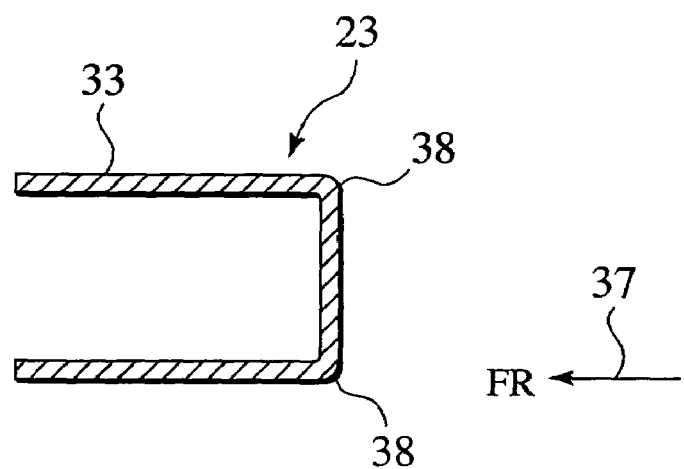
FIG. 4 is a cross-sectional view of the engine mount 23 taken along IV—IV line in FIG. 3.

Auxiliary equipment 36 is disposed in a space 35 between the engine 21 and the engine mount 23. The strength of the engine mount 23 against a load in a longitudinal direction 37 of the vehicle applied thereto, when an impact load is applied to the vehicle from its front side and the engine mount 23 interferes with the auxiliary equipment 36, is set less than the strength of the auxiliary equipment 36 relevant thereto. To be more specific, the engine mount bracket 33 of the engine mount 23 extends vertically in front of the auxiliary equipment 36, and is made of an iron sheet formed into a channel shape by bending with a press machine, to have a pair of vertically extending corner edges 38 on the rear side thereof. In other words, as shown in FIG. 4, the engine mount bracket 33 has a cross section open frontward. Therefore, the engine mount bracket 33 has sufficient compression strength and/or tensile strength against vertical load F1 (see FIG. 3) applied to the engine mount 23 derived from torque generated around a principal axis of inertia of an engine unit E, such as vibration of the engine 21, while the engine bracket 33 has lower strength against horizontal impact load F2 onto the rear side thereof and would be easily deformed by the load F2 to absorb impact energy.

The engine mount fixing point 25a of the engine bracket 22 are set lower than the engine fixing point 26a by a height difference 39. By adjusting the height difference 39, it is possible to adjust a position of interference between the engine mount 23 and the auxiliary equipment 36 when the impact load is applied and deformation occurs.

In this embodiment, the auxiliary equipment 36 to be arranged in the space 35 is a starter motor 41. The starter motor 41 is located with a predetermined gap 43 provided between the rear side thereof and the front part of the engine 21, and with a predetermined gap 45 provided between the front side of the starter motor 41 and the rear side of the engine mount 23 to allow the engine unit E to swing or vibrate. A starter motor magnet switch 42 is provided together with the starter motor 41. The starter motor 41 and the starter motor magnet switch 42 are integrally fixed to a transmission housing (not shown) through a starter motor bracket 44, which is formed integrally with the starter motor 41 and the starter motor magnet switch 42.

In terms of relations in strength (or resistance against deformation) among the respective elements against the load applied thereto when the respective elements interfere with one another due to the impact load applied to the vehicle, it is preferable that the starter motor 41 is set less than the engine 21, the starter motor bracket 44 or the engine mount bracket 33 is set less than the starter motor 41, and the engine bracket 22 is set to be the least of all. In other words, the relations in the strength among the respective elements are preferably set as "the engine bracket 22<the starter motor bracket 44<the engine mount bracket 33<the starter motor 41<the engine 21" or "the engine bracket 22<the engine mount bracket 33<the starter motor bracket 44<the starter motor 41<the engine 21." If the gap 43 is not provided between the starter motor 41 and the front side of the engine 21 as a deformation margin for absorbing the impact energy, then the strength of the starter motor bracket 44 is not questioned.

When the impact load is applied from the front side of the vehicle, deformation and interference of the respective elements occur through the following four stages.

In the first stage, the engine bracket 22 is deformed. The engine mount fixing points 25a on the front ends of the arms 25 move rearward and downward relative to the engine 21. In other words, the engine mount 23 moves downward relative to the engine 21 and simultaneously approaches the engine 21 by deformation of the engine bracket 22. Thereafter, the engine mount bracket 33 of the engine mount 23 and the starter motor 41 which is the auxiliary equipment 36 interfere with each other.

In the second stage, the starter motor 41 approaches the engine 21 by deformation of the starter motor bracket 44 to which the starter motor 41 is fixed. Since the strength of the starter motor bracket 44 against the load at the time of interference is set less than that of the engine mount bracket 33, deformation begins in the starter motor bracket 44 earlier than the engine mount bracket 33. Then, the starter motor 41 moves until the starter motor 41 interferes with the engine 21. During this time, the gap 43 between the starter motor 41 and the front side of the engine 21 is used as the deformation margin for absorbing the impact energy.

In the third stage, the engine mount bracket 33 is deformed. When moving to the third stage from the second stage, the starter motor 41 interferes with the engine 21 at the rear side thereof and with the engine mount bracket 33 at the front side thereof. Here, the strength of the starter motor 41 against the load at the time of interference is set less than that of the engine 21 and higher than that of the engine mount bracket 33. Accordingly, deformation begins first in the engine mount bracket 33 among these three elements. The impact energy is further absorbed by a deformation margin 46 of the engine mount bracket 33.

In the fourth stage, the starter motor 41 is deformed. Since the strength of the starter motor 41 against the load at the time of interference is set less than that of the engine 21, deformation begins in the starter motor 41 earlier than the engine 21. The impact energy is further absorbed by deformation of the starter motor 41 in this event.

Accordingly, it is possible to absorb the impact energy sufficiently with the auxiliary equipment 36 disposed in the space 35 between the engine 21 and the engine mount 23.

In this embodiment, the strength of the engine mount 23 against the load in the vehicle longitudinal direction 37 at the time of interference is set less than that of the auxiliary equipment 36. Accordingly, the engine mount 23 is deformed when the impact load is applied from the front side and thereby prevents the engine 21 from damage. In addition, since the auxiliary equipment 36 can be disposed in the space 35 between the engine 21 and the engine mount 23, it is possible to enhance flexibility of arrangement of equipment inside an engine compartment.

Moreover, the engine bracket 22 has the engine mount fixing points 25a which are positioned lower than the engine fixing point 26a. Accordingly, when the impact load from the front side is applied and transmitted to the engine bracket 22, the arms 25 are deformed so as to move the front ends thereof downward and rearward. When the engine 21 is transversely mounted, the width thereof in the vehicle longitudinal direction 37 is usually smaller in its lower part than in its upper part. Therefore, the space 35 is provided at the lower front side of the engine 21. The controlled deformation of the engine bracket 22 allows the engine mount 23 to move toward the space 35 without interference. Accordingly, it is possible to dispose the auxiliary equipment 36 in this space 35 which is to interfere with the engine mount 23 at the time of deformation. Here, it is also possible to adopt an auxiliary equipment 36 larger in size to efficiently utilize the space 35, and alternatively, to secure a longer deformation margin by maintaining the size of the auxiliary equipment 36. In this way, it is possible to enhance the flexibility of arrangement of equipment inside the engine compartment.

The starter motor 41 is disposed in the space 35 as the auxiliary equipment 36. This eliminates provision of an additional space for the starter motor 41 above the engine 21, and instead, a transmission or other equipment can be disposed in the space above the engine 21. In this way, it is possible to further enhance the flexibility of arrangement of equipment inside the engine compartment.

Figure 5:
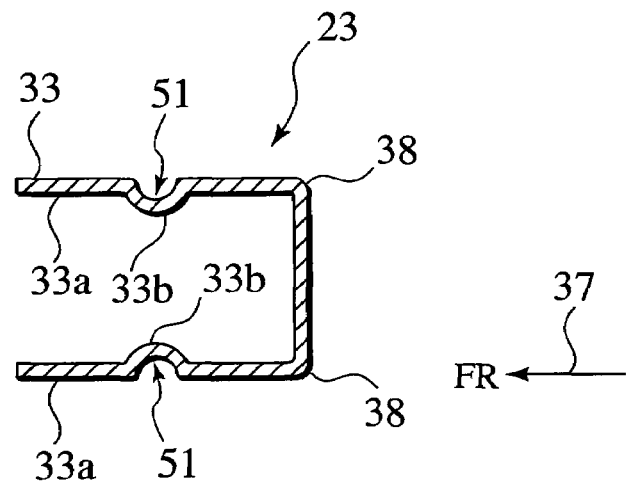
FIG. 5 is a cross-sectional view of the engine mount 23 according to a first modification of the embodiment of the present invention, which is illustrated as similar to FIG. 4.

FIG. 5 shows a first modification of the above-described embodiment. In this modification, the engine mount bracket 33 of the engine mount 23 includes a pair of vertically extending embossed beads 33b formed on inner side faces 33a of the engine mount bracket 33 in the transverse direction of the vehicle so as to protrude inward the channel. These embossed beads 33b constitute fragile portions 51 of the engine mount bracket 33, which reduce the strength of the engine mount bracket 33 against the load in the vehicle longitudinal direction 37.

Since the fragile portions 51 are provided to the engine mount 23 in order to reduce the strength thereof against the load in the vehicle longitudinal direction 37, it is possible to cause the deformation of the engine mount 23 with more certainty when the impact load is applied thereto.

Figure 6:
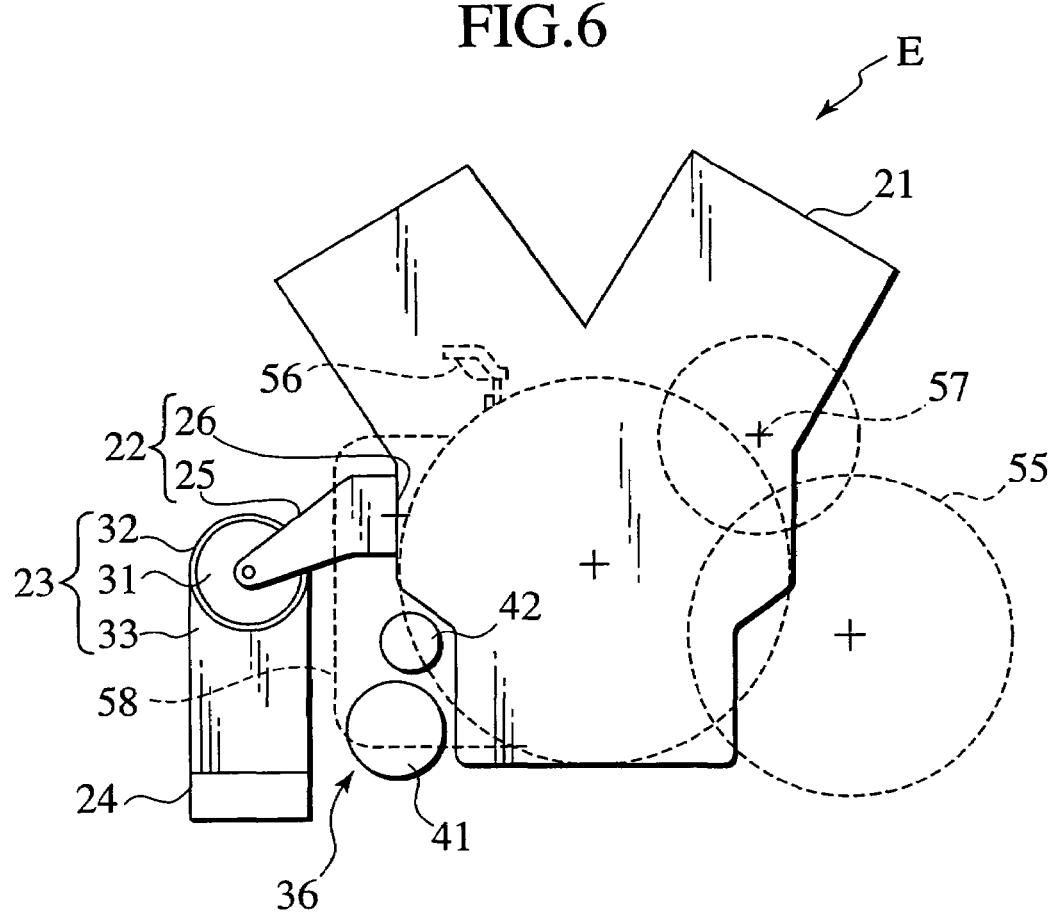
FIG. 6 is a side view of the engine mounting structure according to a second modification of the embodiment of the present invention, which is illustrated as similar to FIG. 2.
Figure 7:
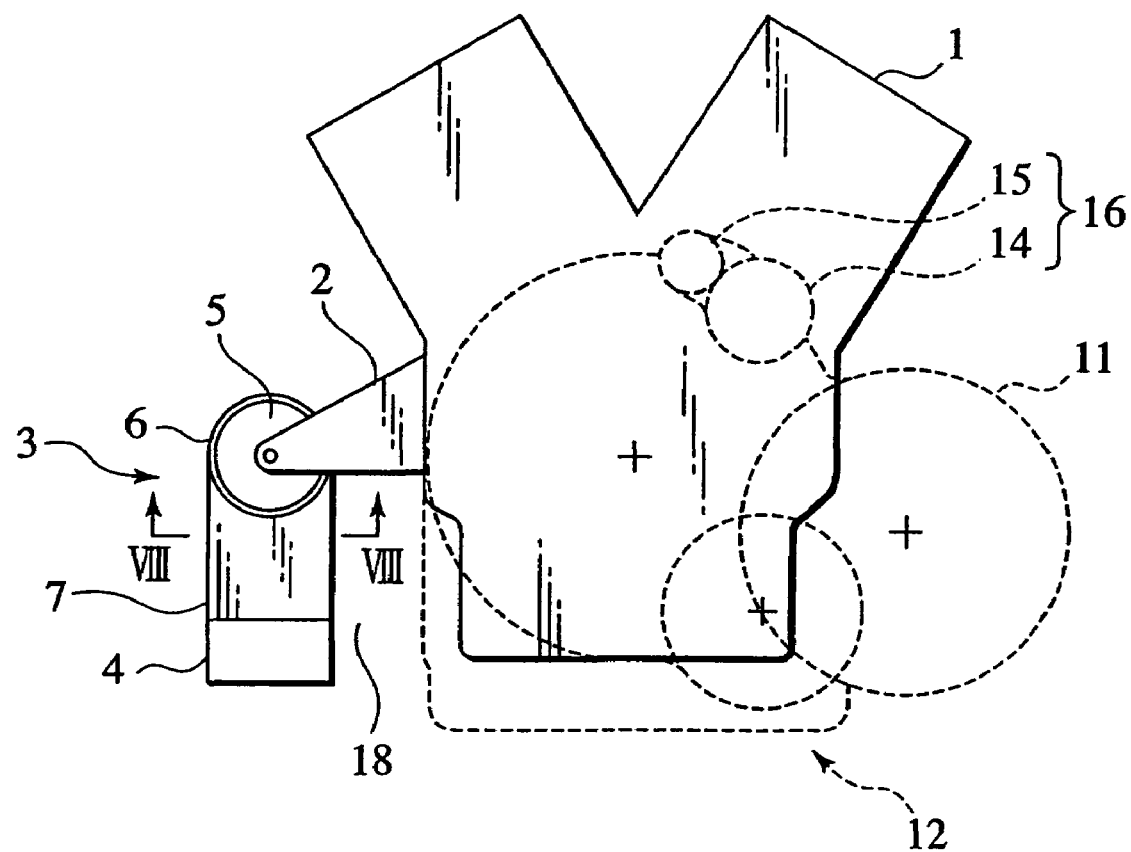
FIG. 7 is a side view of an engine mounting structure of the related art.
Figure 8:
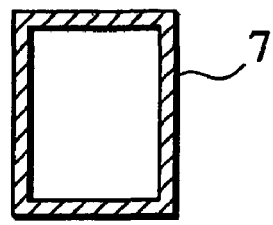
FIG. 8 is a cross-sectional view of an engine mount 3 taken along VIII—VIII line in FIG. 7.
Figure 9:
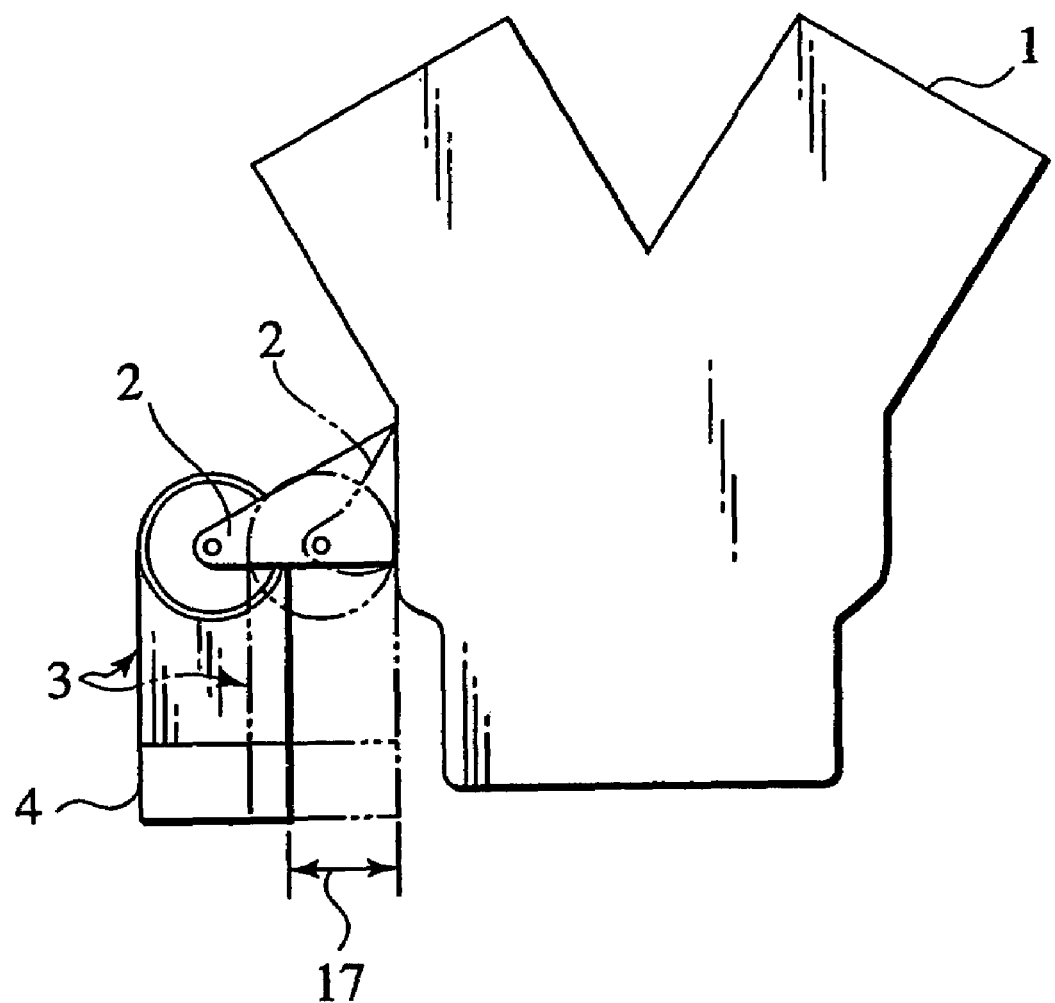
FIG. 9 is a side view of the mounting structure of FIG. 7 showing a state of deformation when an impact load is applied.

FIG. 6 shows a second modification of the above-described embodiment. In this modification, a transmission control lever 56 and a secondary shaft 57 are disposed above a transmission 55, and an oil pan 58 is disposed in front of the transmission 55.

In this way, a downward bulge of the transmission 55 is minimized, and it is possible to lower the mounting position of the engine unit E while securing an appropriate clearance from the ground.

It is to be noted that each of the modifications includes a constitution similar to the embodiment and thereby attains similar operations and effects thereto. Details of the modifications omitted herein conform to the description for the above-described embodiment.

The present disclosure relates to subject matter contained in Japanese Patent Application No. 2002-347223, filed on Nov. 29, 2002, the disclosure of which is expressly incorporated herein by reference in its entirety.

The preferred embodiment described herein is illustrative and not restrictive, and the invention may be practiced or embodied in other ways without departing from the spirit or essential character thereof. For example, the engine of the embodiment may be an electrical motor for a motor-driven vehicle such as electrical vehicle, a fuel cell vehicle, etc. The scope of the invention is indicated by the claims, and all variations which come within the meaning of claims are intended to be embraced herein.

What is claimed is:

1. A structure for mounting an engine for a vehicle comprising:
   a front engine mount for mounting the engine on a front side of the engine in a longitudinal direction of the vehicle, the front engine mount including an engine mount bracket which is fixed on one end thereof to a suspension member and has an insulator held on the other end thereof, the front engine mount mounting the engine with the insulator interposed between the engine and the engine mount bracket, the insulator supporting an engine bracket fixed to the front side of the engine, wherein a space is provided between the front side of the engine and the engine mount bracket; and
   an auxiliary equipment disposed in the space between the front side of the engine and the engine mount bracket, wherein
   the front engine mount has a strength against a load applied thereto in the longitudinal direction of the vehicle less than that of the auxiliary equipment.

2. The structure for mounting an engine according to claim 1, further comprising a first bracket which is fixed to the engine at a first point on the front side of the engine and is supported by the front engine mount at a second point lower than the first point.

3. The structure for mounting an engine according to claim 1, wherein the auxiliary equipment comprises a starter motor.

4. The structure for mounting an engine according to claim 1, wherein the engine mount bracket is formed in a channel shape open frontward.

5. The structure for mounting an engine according to claim 1, wherein the engine mount bracket is provided with a fragile portion which reduces the strength of the front engine mount against the load to the front engine mount in the longitudinal direction of the vehicle.

6. The structure for mounting an engine according to claim 5, wherein the fragile portion comprises a pair of vertically extending emboss beads formed on inner side faces of the engine mount bracket.

7. The structure for mounting an engine according to claim 2, further comprising a second bracket for mounting the auxiliary equipment, wherein
   the auxiliary equipment has a strength against the load applied thereto in the longitudinal direction of the vehicle less than that of the engine,
   the second bracket has a strength against the load applied thereto in the longitudinal direction of the vehicle less than that of the front engine mount, and
   the first bracket has a strength against the load applied thereto in the longitudinal direction of the vehicle less than that of the second bracket.

8. The structure for mounting an engine according to claim 1, wherein
   the auxiliary equipment overlaps in vertical position with the engine mount bracket.

9. The structure for mounting an engine according to claim 8, wherein
   a gap is provided between the auxiliary equipment and the engine mount bracket.

10. The structure for mounting an engine according to claim 1, wherein
    the front engine mount is formed to start deforming before the auxiliary equipment starts deforming when the front engine mount and the auxiliary equipment interfere with each other.

11. The structure for mounting an engine according to claim 10, wherein
    the auxiliary equipment is formed to start deforming before the engine starts deforming when the auxiliary equipment and the engine interfere with each other.

12. The structure for mounting an engine according to claim 1, wherein
    clearances are provided between the auxiliary equipment and the engine, and between the auxiliary equipment and the front engine mount.

13. The structure for mounting an engine according to claim 1, wherein
    the auxiliary equipment is separated from the engine and the front engine mount with a clearance provided around the auxiliary equipment.

14. The structure for mounting an engine according to claim 1, wherein
    the auxiliary equipment overlaps in vertical position with the engine mount bracket from top to bottom of the auxiliary equipment.

* * * * *